United States Patent
Bergman, Jr. et al.

[15] 3,665,206
[45] May 23, 1972

[54] NONLINEAR DEVICES

[72] Inventors: John George Bergman, Jr., Morganville; James Hoffman McFee, Colts Neck, both of N.J.

[73] Assignee: Bell Telephone Laboratories, Incorporated, Murray Hill, Berkeley Heights, N.J.

[22] Filed: Mar. 12, 1971

[21] Appl. No.: 123,724

[52] U.S. Cl. ..........................307/88.3, 321/69 R, 331/107 R
[51] Int. Cl. ..........................................................H03f 7/00
[58] Field of Search.....................307/88.3; 321/69; 331/107

[56] References Cited

UNITED STATES PATENTS 3,395,329   7/1968   Rentzepis ............................307/88.3
3,431,484   3/1969   Pao et al..............................307/88.3

*Primary Examiner*—Roy Lake
*Assistant Examiner*—Darwin R. Hostetter
*Attorney*—R. J. Guenther and Edwin B. Cave

[57] ABSTRACT

Nonlinear devices including second harmonic generators and other parametric devices are fabricated from thin films of organic polymer materials having net dipole moments. Such materials exemplified by polyvinylidene fluoride are prepared for use by mechanical working so as to produce crystallographic alignment, and by electrical poling so as to produce dipolar orientation. Continued "poling" may or may not be necessary during operation of the device. Relative indices of refraction may be altered by altering the degree of crystalline orientation so as to change birefringence. Phase matching with the traversing beam propagating in a given direction may therefore be accomplished for a variety of wavelengths.

14 Claims, 1 Drawing Figure

PATENTED MAY 23 1972
3,665,206
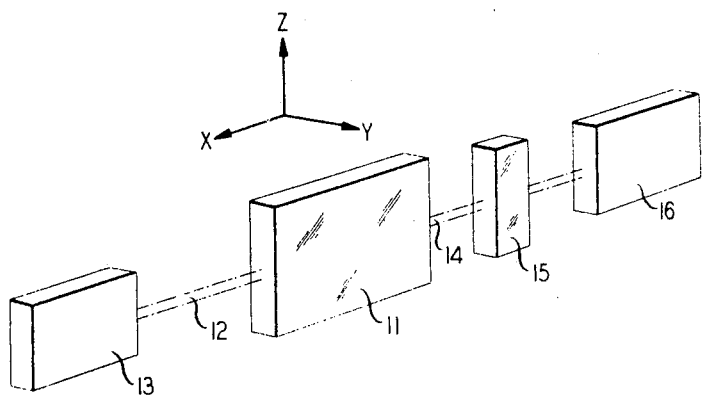
INVENTORS J.G. BERGMAN JR.
J.H. McFEE
BY
ATTORNEY

NONLINEAR DEVICES

BACKGROUND OF THE INVENTION

1. Field of the Invention

The invention is concerned with nonlinear devices operating in the optical and near optical frequency range of electromagnetic radiation. Such devices include second harmonic generators (SHG) and other types of frequency conversion devices such as downshifters, oscillators, mixers, etc.

2. Description of the Prior Art

The past decade has seen a significant body of art develop as a consequence of the invention of the laser oscillator. This source of coherent electromagnetic radiation at wavelengths in and near the visible spectrum has had significant impact in many fields. There is now a variety of laser devices which together utilize all the known forms of matter. Ancillary practical developments have included a variety of devices for controlling and modifying radiation produced by lasers. These include amplifiers, modulators, isolators, deflectors, etc.

Many contemplated uses of coherent radiation require a variety of radiation wavelengths, sometimes continuous over at least a significant portion of the spectrum. There have been studies, and resultant developments, designed to meet this requirement in the oscillator itself. A second approach probably of more immediate practical interest has been directed towards the development of auxiliary elements for changing frequency in a fixed-frequency oscillator.

At this time the most promising class of such auxiliary elements depends on nonlinearity, i.e., the nonlinear response of the polarization of the medium to the amplitude of the wave. Devices based on this phenomenon may take various forms. The most common of these is the second harmonic generator (SHG). A more generic class is described as parametric devices which include SHG's but also include other types of frequency converting devices such as those which downshift or mix.

While any polarizable material, i.e., any material which is noncentric in the usual crystallographic sense evidences nonlinearity, and may therefore, in principle, operate as a parametric device, assuming, of course, that it is transparent for the wavelength of concern.

There is an additional material requirement which eliminates most polarizable materials for practical device use. Real materials are generally dispersive, that is to say, the velocity at which wave energy passes through the medium is frequency dependent. It follows therefore that in a nonlinear device of the nature here described in which there is necessarily present at least two different frequencies of wave energy; that there are at least two different waves which under normal circumstances travel through the medium at different velocities. The nature of the parametric device generally requires continuing conversion of light of one wavelength into light of a different wavelength. It is in this way that the generating energy continually builds up. Since however, in a dispersive medium, the generating wave travels at a velocity which is different from that of the generated (different frequency) wave, it follows that under ordinary circumstances, the generated wave successively interacts destructively and constructively with itself. This gives rise to a manifestation sometimes referred to in terms of coherence length. Coherence length is generally defined as the distance over which succeeding portions of the generated wave are sufficiently close to being in phase with preceding or succeeding portions so that interaction is generally constructive. Typically coherence distances in real materials for the SHG case may be of the order of about 35 micrometers. Since even the best nonlinear materials have nonlinear coefficients of the order of about $10^{-9}$ esu (indicating a percent of conversion from one frequency to another of the order of only about $10^{-4}$ percent for a typical SHG conversion): It was early recognized that some design improvision would be required to overcome this inherent limitation of dispersive media.

The solution to this problem most commonly in use at this time was first described by J. A. Giordmaine in Vol. 8, *Physical Review Letters* p. 19 (1962). The Giordmaine approach utilizes a nonlinear medium which evidences a degree of birefringence at least as great as the frequency dispersion of the medium. A propagation direction properly chosen within the medium sets the velocity of the extraordinary ray of one wave equal to the ordinary ray of another wave. This solution to the problem is also applicable to systems in which there are more than two waves of different frequencies.

Since the vast variety of parametric uses involve a varying number of waves of a variety of frequencies and since the amount of dispersion varies in any given material depending both on the portion of the spectrum in which the energy is located and also on the difference between the wavelengths of the different waves of concern; it follows that phase matching may require any of a variety of birefringence values. Since the degree of dispersion is temperature dependent with dispersion decreasing as temperature increases; it has been recognized that "temperature-tuning" may be utilized to bring about the phase matching requirement. In the instance of parametric oscillation this may be used as a means for selecting the frequency of the output, see for example U.S. Pat. No. 3,262,058. An alternative type of tuning takes advantage of the dependence of dispersion on applied electric field and this means also has been used. Since this is generally a smaller order of fact electric field tuning is sometimes imposed on temperature-tuning as a type of "vernier."

Even temperature-tuning, however, has its limitations particularly where frequencies of different waves of concern approach each other closely. It is clear that the temperatures required may be so high as to be impractical.

SUMMARY OF THE INVENTION

In accordance with the invention, nonlinear devices are constructed of any of a variety of organic polymer materials. Materials of the invention are, of course, polarizable and in addition have the requisite optical properties to permit uses over broad frequency ranges. Appropriate choice of materials in the classes presented permit operation over a range encompassing the optical spectrum and extending into the infrared. All materials of the invention are birefringent and have a sufficient value of maximum birefringence to permit phase matching over a variety of conditions.

Suitable materials include members which have already been reported as being piezoelectric, see for example Vol. 8, *Japanese Journal of Applied Physics*, p. 975 (1969).

Required characteristics which are set forth in some detail in a later section are briefly described. To be suitable for the practice of the invention, polymer materials must have a net dipolar moment. Since the nonlinear effect depends upon the relationship between polarizability and amplitude, the first requirement is a significant net dipolar moment. Dipolar moment is contributed primarily by substituent groupings on the polymer chain. The best of these are chosen from those known to produce high moment. Since polymers of concern are made up of chains which are primarily or, at least, largely, carbon, substituent groupings are so chosen as to have an electronegativity substantially different from that of carbon. A particularly useful bond is the carbon fluorine bond. A preferred class of materials is exemplified by polyvinylidene fluoride. Of course, the general requirement of net moment suggests that dipolar bonding be acentric to avoid cancellation and accordingly totally fluorinated straight chain polymers, for example, are not generally useful.

A nonlinear effect requires a net dipolar alignment. This is accomplished by imposition of an electric field generally a d.c. electric field of appropriate strength. In a preferred class of materials, herein, such alignment is "frozen-in" so that the material manifests remanent polarization and so that a field need not be maintained during use. Since dipole aligning or "poling" is accomplishable with small electric fields at increased temperature, it is generally carried out at an elevated temperature. Materials of the invention which do not exhibit remanent polarization or show significant relaxation of dipolar moment during use require continued imposition of an electric field during use.

A significant aspect of the invention is concerned with birefringence, i.e., the characteristic responsible for phase matching. It has been stated that the materials of the invention are invariably possessed of a sufficient degree of birefringence to permit phase matching over a broad range of conditions. However, too high a value is undesirable and techniques usable for reducing birefringence in inorganic materials may be unsuitable (e.g., available temperature-tuning range is small and propagation direction is constrained by film configuration).

A significant aspect of the invention arises from the relationship between birefringence and the degree of ordering of the polymer. Ordering in the polymer is usually the result of mechanical working. Maximum ordering may be produced in films fabricated by commercial techniques which place the film in two-dimension or biaxial tension. A lesser degree of mechanical or crystallographic ordering results if the film is placed under uniaxial tension. Random ordering on the other hand which may be produced by heating near the melting point or simply by producing the original body by some means that does not involve mechanical working (e.g., casting) results in zero birefringence.

It is seen therefore that polymers of the invention are capable of existing in a variety of degrees of order which may correspond in turn to a measure of birefringence within the entire range of from 0 up to the maximum birefringence corresponding with 100 percent order. A significant aspect of the invention involves the adjustment of birefringence to the desired value by adjusting the degree of crystallographic order.

The above discussion implies that polymers of the invention are possessed of at least a degree of crystallinity. In general, it is a requirement that crystallinity in polymers intended for use in the present invention be at least 10 percent crystalline as measured in accordance with the technique described in Chap. 3, *X-ray Properties of Polymers* by Alexander, Wiley 1969. *Brief Description of the Drawing*

The FIGURE is a schematic view of a nonlinear device using a material of the invention.

DETAILED DESCRIPTION

1. The FIGURE depicts a polymer body 11 of the polymer material of the invention. A coherent electromagnetic beam 12 produced by source 13 is introduced into body 11 as shown. The resulting emerging beam 14 is then caused to pass through filter 15. Upon departing the beam is sensed by detecting apparatus 16. For the SHG case beam 12 is at a fundamental frequency while departing beam 14 additionally contains a wave of frequency corresponding with the first overtone (second harmonic of beam 12). Filter 15 in the SHG case is of such nature as to pass only a wave of such overtone frequency. Apparatus 16 senses only that portion of the beam leaving filter 15.

The device of the figure may similarly be regarded as another form of parametric device. Such a device may be degenerate or may involve three different frequencies. Beam 12 may contain frequencies to be mixed or may consist of a pump frequency. In the three-frequency case exiting beam 14 contains signal and idler frequencies as well as a pump frequency and therefore represents three distinct values.

For any type of operation there are instances under which it is desired to operate in a resonant chamber. This is usually accomplished by coating the surfaces of body 11 through which the beam enters and exits. This coating may be totally reflecting for the pump energy and partially reflecting for the generated energy as, for example, for the harmonic in SHG. For the three frequency case it is desirable to support both generated frequencies. In most instances, this cannot be accomplished by coating the face of the body and it is necessary to provide at least one spaced adjustable mirror which may be positioned at such distance from the face of the body 11 as to support the frequencies of concern. Simultaneous support of the pump frequency may similarly be accomplished.

2. Composition and Preparation

Certain fundamental requirements for materials of the invention have been described. It has been indicated that they must be possessed of net dipole moment. A preferred class which manifests remanent polarization has been described.

It is possible to prescribe preferred substituent groupings on the basis of the fundamental requirement, i.e., substantial dipolar moment. It has been stated that the dipolar strength is dependent upon proper distribution of substituent groupings which are separated from the members of the polymer chain in terms of electronegativity. Materials of this invention are generally carbon-containing, substituent bonding is generally to a carbon atom, and electronegativity is therefore to be measured relative to carbon. Probably the most useful bond is the carbon to fluorine bond, although other substituents such as any of the other halogens and (or other substituents bonded to a carbon through an oxygen of ester, acid, enol, ketone, etc.) hydroxyl, amide and imide and nitrate groupings are also useful. The requirement of net dipolar moment in turn requires that there not be total cancellation. A material such as a fully fluorinated ethylene polymer, while it contains strongly polar bonds, has no net dipole moment. By contrast, a partially fluorinated polymer of the same class such as trifluoroethylene polymer does have a net dipole moment and does therefore meet that inventive requirement.

The exact nature of the cooperation between dipolar bonds is not known. It may be, for example, that polymeric materials of the nature here concerned do not manifest spontaneous polarization in the manner of inorganic crystalline materials. It may be that materials which show retention of net dipolar moment are dependent not upon the pure energetics of dipole-to-dipole coupling but rather on the rigidity of the molecular system involved.

Regardless of the nature of the responsible mechanism materials found suitable for the practice of the invention are found to be highly crystalline and are properly classified by space-group designations of the nine classes which correspond to crystalline symmetries which permit the existence of ferroelectricity. Accordingly, polyvinylidene fluoride is of the space-group designation Cm2m. Other useful representative materials include polyfluorostyrene, polyacrylonitrile, polyvinylfluoride, poly-o-fluorostyrene and polyvinylidene chloride (all belonging to polar point groups, i.e., $C_n$ and $C_{nv}$ where $n = 1, 2, 3, 4,$ or $6$).

A high degree of crystallinity, at least 10 percent on the usual basis as described in (Chap. 3, *X-Ray Properties of Polymers* by Alexander, Wiley 1969) is certainly desirable. Experimentally, however, it has been determined that suitable samples do show some dipolar relaxation during use so that imposition of a field, even on a material manifesting remanent polarization, may result in some strengthening of response. This behavior is not characteristic of conventional ferroelectric materials and suggests that while crystalline materials of ferroelectric space-groupings may be preferred, suitable behavior may also be obtained in the total absence of ferroelectric coupling. For example, use may be made of materials having "frozen-in" dipole moment, i.e., materials ordinarily classified as electrets.

The fact remains that preferred materials are highly crystalline and do have space designations which permit ferroelectricity. Crystallographic orientation is easily achievable in the usual film sections by biaxial stressing, as for example by blowing into a mold. Poling, either short-term or continuous, requires imposition of a fairly high field ordinarily of the order of at least about 300 K volts per cm. (For the usual film which may have a thickness of about 20 micrometers a field of 600 volts may suffice.) As in conventional ferroelectrics, increasing temperature permits reduced poling fields. Initial poling is usually carried out with the material heated to near its melting point (and field is generally maintained as temperature is reduced).

While commercial films produced for example by blowing are suitable for the practice of the invention, alternative procedures may be equally rewarding. Under certain circumstances polymers deposited on metallic surfaces may be possessed of crystallographic orientation, or may conceivably be mechanically worked even as deposited films to yield such orientation. Films so formed, as for example by in situ polarization may, of course, be poled in the same manner as self-supporting films. Counter electrodes may be deposited in any conventional fashion and may or may not be supplemented with radiation absorbing layers as described.

3. Examples

Table I is a tabulation of eight examples in which specimens of polymers in accordance with the invention are shown. For comparison purposes, all examples were conducted on polyvinylidene film material evidencing a degree of crystallinity of approximately 50 percent as measured by X-ray. Two of the examples, Nos. 1 and 6, are directed to the use of specimens which were measured as received from the supplier. While such specimens were prepared by a technique which involves some biaxial alignment, it is seen that orientation was less than maximum. Samples before working (examples 1 and 6) were of approximate dimensions 2 inches by 2 inches by 0.8 mil.

The procedure followed was to apply stress in the crystallographic direction indicated with a sample heated to a temperature of about 100°C. The first two columns indicate the stress applied in terms of the draw ratio defined as final length in the draw direction divided by initial length in the draw direction.

Columns 3 through 5 indicate the bulk refractive indices $n_x$, $n_y$ and $n_z$ as measured in the three crystallographic directions and the last two columns set forth the birefringence, i.e., the difference in refractive index first for waves polarized in the $x$ and $z$ directions and finally for waves polarized in the $y$ and $z$ directions.

Index and birefringence values were measured for a frequency of about 0.53 micrometer. Dispersion of the same general form in each of the three directions is at a value of about 0.0151 for wavelengths of 1.06 micrometers and 0.45 micrometer and rises to a maximum of the order of about 0.02 for the transparency range of the polymer. Comparison of these dispersion values with the birefringence values set forth in the table indicates that phase matching may be accomplished for any set of frequencies by introducing the appropriate degree of orientation (as induced by working). Using this principle, samples evidencing relatively short coherent slants have been stretched to tailor their birefringence values so as to increase the "coherence length" to where it included the entirety of the sample. The degree of working required for any particular phase-matching condition, of course, varies with the history of the sample. While major changes in birefringence have generally required a draw ratio of about 1.1 (10 percent elongation), precise adjustment may utilize draw ratios as small as 1.01 (this corresponding generally to a birefringence change in the fourth decimal place in the birefringence).

While the examples are in terms of uniaxial draw ratios, biaxial working is equally efficacious and may be preferred where the desire is to increase the degree of orientation (to increase the birefringence). Since heating without drawing results in some relaxation, its effect is to decrease orientation, i.e., to decrease birefringence. Other types of treatment may be usefully applied. For example, films may be compressed along the $z$ axis. Useful forms of working include swagging, rolling (both flat rolling and roll flatening), etc. In general terms, a degree of orientation change considered significant from the inventive standpoint may be expressed in terms of the working requirement that there be a dimensional change at least of 0.01 percent in any direction.

TABLE I

| Ex. | Draw ratio, $x$ direction | Final length/initial length, $y$ direction | Refractive index | | | Birefringence | |
|---|---|---|---|---|---|---|---|
| | | | $n_x$ | $n_y$ | $n_z$ | $\Delta n_{xz}$ | $\Delta n_{yz}$ |
| 1 | 1.0 | 1.0 | 1.424 | 1.424 | 1.419 | 0.005 | 0.005 |
| 2 | 1.3 | 1.0 | 1.427 | 1.429 | 1.417 | 0.010 | 0.002 |
| 3 | 2.3 | 1.0 | 1.434 | 1.418 | 1.420 | 0.014 | 0.002 |
| 4 | 3.2 | 1.0 | 1.440 | 1.414 | 1.414 | 0.026 | 0.000 |
| 5 | 4.2 | 1.0 | 1.442 | 1.414 | 1.414 | 0.028 | 0.000 |
| 6 | 1.0 | 1.0 | 1.432 | 1.420 | 1.420 | 0.012 | 0.000 |
| 7 | 1.0 | 1.2 | 1.425 | 1.419 | 1.415 | 0.010 | 0.004 |
| 8 | 1.0 | 2.4 | 1.422 | 1.424 | 1.414 | 0.008 | 0.011 |

Phase matching utilizing the materials of the examples is accomplished by introducing electromagnetic radiation into an edge of film material. By use of a closely matching refractive index material to minimize scattering, it is desirable to have such introduction be through a plane, desirably (optically polished) surface. Other coupling means as, for example, prism, may be utilized. For SHG and other operations, the incoming beam which is plane polarized and which consists primarily of the fundamental wavelength is introduced with its plane of polarization parallel to a high index direction, i.e., parallel to the $x$ crystallographic axis. In polyvinylidene fluoride, the $d_{31}$ coupling coefficient is of larger magnitude than is the $d_{32}$ so that propagation in the $y$ crystallographic direction is generally preferred. The bulk index $n_z$ is generally the low index so that propagation and polarization directions are chosen so as to couple the harmonic with its polarization parallel to the $z$ axis. In other parametric operations, the polarization plane of the shortest wavelength ray is made parallel to a low index direction, i.e., $z$. Accordingly, in parametric downshifting operations, the higher frequency (shorter wavelength) incoming radiation is so polarized.

What is claimed is:

1. Device comprising a body of material evidencing a net dipolar electric moment, said body being transparent to electromagnetic wave energy at some wavelength within the optical and infrared spectra, together with first means for introducing a beam of coherent electromagnetic radiation into said body and second means for extracting a beam of coherent electromagnetic radiation from said body, in which the extracted beam includes at least one component of electromagnetic wave energy of wavelength different from that of any component included in the introduced beam, characterized in that said body consists essentially of a polymer material evidencing at least 10 percent crystallinity as measured by X-ray, the birefringence of which is tailored for phase-matching by altering the degree of crystallographic order.

2. Device of claim 1 in which altering of crystallographic order is accomplished by mechanical working.

3. Device of claim 2 in which said mechanical working results in a dimensional change of at least 0.01 percent in at least one direction in said body.

4. Device of claim 3 in which said mechanical working is in the form of drawing.

5. Device of claim 4 in which said drawing is uniaxial.

6. Device of claim 4 in which said drawing is biaxial.

7. Device of claim 4 in which said drawing produces a dimensional change of at least 10 percent in at least one direction within said body.

8. Device of claim 1 in which said body is a film consisting essentially of a substituted hydrocarbon polymeric material containing bonds selected from the group consisting of C—O, C—N and C-halogen.

9. Device of claim 8 in which said polymeric material consists essentially of a polymer selected from the group consisting of polyvinylfluoride, poly-o-fluorostyrene, polyvinylidene chloride, polyfluorostyrene, polyacrylonitrile.

10. Device of claim 9 in which the said polymer is polyvinylidene fluoride.

11. Device of claim 1 in which the said first means includes an optically polished surface.

12. Device of claim 1 in which the said first means includes a coupling material having an index of refraction which is closely matched to that of the said body.

13. Device of claim 1 in which said incoming beam is plane polarized in which the plane of polarization is along the $x$ crystallographic direction and in which the propagation direction of the beam is in the $y$ crystallographic direction.

14. Device of claim 1 in which the said incoming beam is plane polarized along the $z$ crystallographic direction and in which propagation is along the $x$ crystallographic direction.

* * * * *